US010558577B2

United States Patent
Mukherjee et al.

(10) Patent No.: US 10,558,577 B2
(45) Date of Patent: *Feb. 11, 2020

(54) MANAGING MEMORY ACCESS REQUESTS WITH PREFETCH FOR STREAMS

(71) Applicant: Cavium, LLC, Santa Clara, CA (US)

(72) Inventors: Shubhendu Sekhar Mukherjee, Southborough, MA (US); David Albert Carlson, Haslet, TX (US); Srilatha Manne, Portland, OR (US)

(73) Assignee: Cavium, LLC, Santa Clara, CA (US)

(*) Notice: Subject to any disclaimer, the term of this patent is extended or adjusted under 35 U.S.C. 154(b) by 22 days.

This patent is subject to a terminal disclaimer.

(21) Appl. No.: 16/011,173

(22) Filed: Jun. 18, 2018

(65) Prior Publication Data

US 2018/0300247 A1 Oct. 18, 2018

Related U.S. Application Data

(63) Continuation of application No. 15/269,072, filed on Sep. 19, 2016, now Pat. No. 10,013,357.

(Continued)

(51) Int. Cl.
*G06F 12/00* (2006.01)
*G06F 12/0862* (2016.01)
(Continued)

(52) U.S. Cl.
CPC ...... *G06F 12/0862* (2013.01); *G06F 12/0897* (2013.01); *G06F 2212/1016* (2013.01);
(Continued)

(58) Field of Classification Search
CPC ............ G06F 12/0862; G06F 12/0897; G06F 2212/6024; G06F 2212/1016; G06F 2212/6026

See application file for complete search history.

(56) References Cited

U.S. PATENT DOCUMENTS 5,761,706 A 6/1998 Kessler et al.
6,976,147 B1 12/2005 Isaac et al.
(Continued)

OTHER PUBLICATIONS

Michaud, Pierre, "A Best-Offset Prefetcher", $2^{nd}$ Data Prefetching Championship, Jun. 2015, Portland, France, 2015 <hal-01165600>.

(Continued)

*Primary Examiner* — Mark A Giardino, Jr.
(74) *Attorney, Agent, or Firm* — Young Basile Hanlon & MacFarlane, P.C.

(57) ABSTRACT

Managing memory access requests to a cache system including one or more cache levels that are configured to store cache lines that correspond to memory blocks in a main memory includes: storing stream information identifying recognized streams that were recognized based on previously received memory access requests, where one or more of the recognized streams comprise strided streams that each have an associated strided prefetch result corresponding to a stride that is larger than or equal to a size of a single cache line; and determining whether or not a next cache line prefetch request corresponding to a particular memory access request will be made based at least in part on whether or not the particular memory access request matches a strided prefetch result for at least one strided stream, and a history of past next cache line prefetch requests.

14 Claims, 3 Drawing Sheets

Related U.S. Application Data

(60) Provisional application No. 62/333,505, filed on May 9, 2016.

(51) Int. Cl.
 G06F 12/0897 (2016.01)
 *G06F 13/00* (2006.01)
 *G06F 13/28* (2006.01)

(52) U.S. Cl.
 CPC .............. *G06F 2212/6024* (2013.01); *G06F 2212/6026* (2013.01)

(56) References Cited

U.S. PATENT DOCUMENTS

| | | |
|---|---|---|
| 7,350,029 B2 | 3/2008 | Fluhr et al. |
| 7,383,418 B2 | 6/2008 | Janik et al. |
| 7,487,296 B1 | 2/2009 | Iacobovici et al. |
| 7,516,279 B2 | 4/2009 | Griswell et al. |
| 7,627,742 B2 | 12/2009 | Bose et al. |
| 7,716,424 B2 | 5/2010 | Franaszek et al. |
| 8,103,832 B2 | 1/2012 | Gara et al. |
| 8,433,852 B2 | 4/2013 | Hu et al. |
| 8,443,151 B2 | 5/2013 | Tang et al. |
| 8,856,452 B2 | 10/2014 | Sun et al. |
| 9,026,739 B2 | 5/2015 | Manne et al. |
| 9,098,418 B2 | 8/2015 | Kannan et al. |
| 2009/0199190 A1 | 8/2009 | Chen et al. |
| 2011/0010506 A1 | 1/2011 | Greer et al. |

OTHER PUBLICATIONS

Nesbit, K. J. and Smith, J. E., "Data Cache Prefetching Using a Global History Buffer", HPCA '04 Proceedings of the 10th International Symposium on High Performance Computer Architecture (p. 96).

PAGE 1

| | | | | | | | |
|---|---|---|---|---|---|---|---|
| | A1 | A2 | | A3 | | | |
| | | | | | | | |
| | | | | | | | |
| | | | | | | | |
| | | | | | | | |
| | | | | | | | |
| | | | | | | | |

PAGE 2

| | | | | | | | |
|---|---|---|---|---|---|---|---|
| | | | | | | | |
| | | | B5 | | | B4 | |
| | | | B3 | | | B2 | |
| | | | B1 | | | | |
| | | | | | | | |
| | | | | | | | |
| | | | | | | | |

PAGE 3

| | | | | | | | |
|---|---|---|---|---|---|---|---|
| | | | | | | | |
| | X1 | X2 | X3 | X4 | | | |
| | | | | | | | |
| | | | | | | | |
| | | | | | | | |
| | | | | | | | |
| | | | | | | | |

FIG. 2

MANAGING MEMORY ACCESS REQUESTS WITH PREFETCH FOR STREAMS

CROSS-REFERENCE TO RELATED APPLICATIONS

This application is a continuation of U.S. patent application Ser. No. 15/269,072, filed Sep. 19, 2016, which claims the benefit of U.S. Provisional Application No. 62/333,505, filed May 9, 2016, each of which is incorporated herein by reference.

BACKGROUND

This description relates to managing memory access requests with prefetch for streams.

Modern processors support 'prefetch' for certain memory requests, including 'streams'. A stream (also called a 'strided stream') occurs when there is a sequence of multiple requests for values, where the address offset between adjacent values in the stream (called the 'stride') is fixed (e.g., measured in cache lines (or 'cache blocks'). Alternatively, 'correlated prefetching' can be performed, where the address offset between a previous value and a next value that is assumed to be correlated to a previous value is equal to a single cache line by default. A stream can be increasing, or decreasing, in the addresses of adjacent values. Generally, a prefetch request is a type of memory request that attempts to predict a future memory request based on a predicted access pattern. The prefetch request is used to preload a cache level (e.g., of a data cache) so that the future memory request will hit in that cache level instead of having to access a higher cache level or a main memory. A stream may be detected (or 'learned') after its stride is determined and one or more prefetched values have been successfully predicted. Some processors may be configured to perform prefetching for multiple separate, independent streams. For each stream, a training mechanism may be performed separately for each independent stream to detect its stride value, without taking into account the type of any previous prefetching.

SUMMARY

In one aspect, in general, a method for managing memory access requests to a cache system including one or more cache levels that are configured to store cache lines that correspond to memory blocks in a main memory includes: storing stream information identifying recognized streams that were recognized based on previously received memory access requests, where one or more of the recognized streams comprise strided streams that each have an associated strided prefetch result corresponding to a stride that is larger than or equal to a size of a single cache line; and determining whether or not a next cache line prefetch request corresponding to a particular memory access request will be made based at least in part on whether or not the particular memory access request matches a strided prefetch result for at least one strided stream, and a history of past next cache line prefetch requests.

In another aspect, in general, a memory system includes: at least one memory controller for accessing a main memory; a cache system including one or more cache levels that are configured to store cache lines that correspond to memory blocks in the main memory; and a memory access request manager configured to manage memory access requests. The managing includes: storing stream information identifying recognized streams that were recognized based on previously received memory access requests, where one or more of the recognized streams comprise strided streams that each have an associated strided prefetch result corresponding to a stride that is larger than or equal to a size of a single cache line; and determining whether or not a next cache line prefetch request corresponding to a particular memory access request will be made based at least in part on whether or not the particular memory access request matches a strided prefetch result for at least one strided stream, and a history of past next cache line prefetch requests.

Aspects can include one or more of the following features.

The strided streams comprise a plurality of strided streams, where a first strided stream has an associated first strided prefetch result corresponding to a first stride, and a second strided stream has an associated second strided prefetch result corresponding to a second stride that is larger than the first stride.

The first strided prefetch result and the second strided prefetch result have a plurality of highest order address bits that are identical to each other.

For each of one or more strided streams included in the recognized streams, at least one next cache line prefetch request was made corresponding to at least one memory access request of a set of multiple memory access requests based on which that strided stream was recognized.

Each of the memory access requests of the set of multiple memory access requests has a plurality of highest order address bits that are identical to each other.

If the particular memory access request does not match any strided prefetch result, then a next cache line prefetch request corresponding to the particular memory access request is made; and if the particular memory access request does match a strided prefetch result for at least one strided stream, then a next cache line prefetch request corresponding to the particular memory access request is not made.

If the particular memory access request does not match any strided prefetch result, then whether or not a next cache line prefetch request corresponding to the particular memory access request is made is determined based at least in part on stored history information that depends on results of past next cache line prefetch requests corresponding to memory access requests made before the particular memory access request; and if the particular memory access request does match a strided prefetch result for at least one strided stream, then a next cache line prefetch request corresponding to the particular memory access request is not made.

The stored history information comprises a state of a counter that is accessed based on a combination that includes: (1) bits from an address of the particular memory access request, and (2) bits from an address of at least one of the memory access requests made before the particular memory access request.

The state of the counter is stored in a data structure that is indexed by a result of a function that preforms the combination.

The history of past next cache line prefetch requests comprises stored history information that depends on results of past next cache line prefetch requests corresponding to memory access requests made before the particular memory access request, and the stored history information is accessed based on a combination that includes: (1) bits from an address of the particular memory access request, and (2) bits from an address of at least one of the memory access requests made before the particular memory access request.

Each stride is computed based on a difference between a first address of a first memory access request and a second address of a second memory access request, where the first and second addresses have a plurality of highest order bits that are identical to each other.

Aspects can have one or more of the following advantages.

Prefetch requests may bring data/instructions into a data/instruction cache without that data/instruction being immediately used, making a particular prefetch request useless. It can be useful to avoid certain prefetch requests by using information about existing previously learned streams to determine whether or not to make prefetch requests for certain other streams. For example, before the determination of whether or not a next cache line prefetch request will be made in response to a particular memory access request, a prefetcher can first determine whether or not the particular memory access request matches a previously learned strided stream. If a strided stream is matched then a next cache line request is not made, but if a strided stream is not matched then a next cache line request is potentially made (optionally, based on a further condition associated with the history of correlated prefetching). This dependence between correlated prefetching and strided stream prefetch requests is advantageous for reducing useless prefetch requests that may pollute the cache.

Other features and advantages of the invention will become apparent from the following description, and from the claims.

DESCRIPTION OF DRAWINGS

FIG. 2 is a schematic diagram illustrating memory access patterns.

DESCRIPTION

Figure 1:
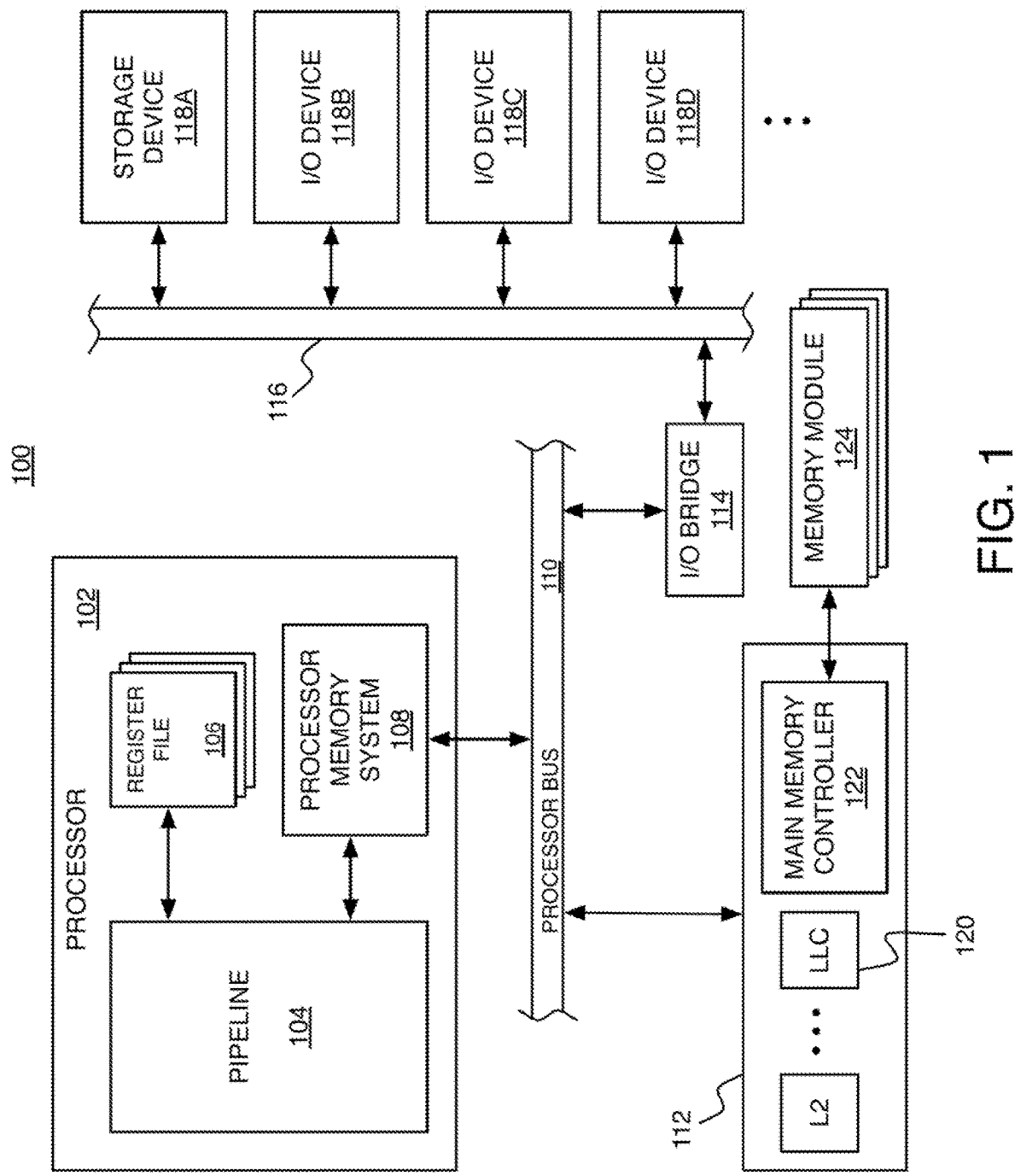
FIG. 1 is a schematic diagram of a computing system.

FIG. 1 shows an example of a computing system 100 in which the stream prefetching techniques can be used. The system 100 includes at least one processor 102, which could be a single central processing unit (CPU) or one of multiple processor cores of a multi-core architecture. In this example, the processor 102 includes a pipeline 104, one or more register files 106, and a processor memory system 108. The processor memory system 108 includes circuitry that implements a memory access request manager for managing memory access requests including prefetch mechanisms for streams, also called simply a 'prefetcher', as described in more detail below. The processor 102 is connected to a processor bus 110, which enables communication with an external memory system 112 and an input/output (I/O) bridge 114. The I/O bridge 114 enables communication over an I/O bus 116, with various different I/O devices including a storage device 118A and other I/O devices 118B-118D (e.g., network interface, display adapter, and/or user input devices such as a keyboard or mouse). The storage device 118A such as a disk drive or other large capacity (typically non-volatile) storage device can spare some space to serve as secondary storage (or a 'backing store') in a virtual memory scheme for the (typically volatile) main memory.

In such a virtual memory scheme, program instructions being executed by a CPU to refer to virtual addresses within a 'virtual address space' that is larger than a 'physical address space' that is defined by the size of main memory. Virtual memory involves address translation from one or more such virtual address spaces into a physical address space. The translation is performed using a 'page table' that stores mappings between virtual addresses and physical addresses at a granularity of memory pages (or simply 'pages'), such that a given virtual page number (VPN) is mapped to a particular physical page number (PPN). The virtual and physical pages may have the same size (e.g., 4K), but that size may vary under certain circumstances. Different virtual pages are swapped into and out of a smaller number of physical pages. The page table is often cached within the processor 102 (within a structure called a translation lookaside buffer), along with the data and instruction caches of a hierarchical cache system.

In the computing system 100, the processor memory system 108 and external memory system 112 together form such a hierarchical cache system including at least a first level cache (labeled herein as 'L1') within the processor memory system 108, and any number of higher level caches ('L2', 'L3', ... ) within the external memory system 112. The highest level cache within the external memory system 112 (which may be the L2 cache if there are only two levels in the hierarchy) is the LLC 120, which is accessed just before main memory. Of course, this is only an example. The exact division between which level caches are within the processor memory system 108 and which are in the external memory system 112 can be different in other examples. For example, the L1 cache and the L2 cache could both be internal to the processor 102, and the L3 (and higher) caches could be external to the processor 102. If the processor 102 is a multi-core processor, each core could have its own internal L1 cache, and the cores could share an L2 cache. For the purposes of some of the examples described herein, the system 100 will be assumed to have the L1 cache within the processor 102 and the L2 cache and higher levels within the external memory system 112. The external memory system 112 also includes a main memory controller 122, which is connected to any number of memory modules 124 serving as main memory (e.g., Dynamic Random Access Memory modules). In a particular cache level of the hierarchy, each cache entry includes space for storing the data words of a particular memory block along with bits for determining whether a particular word from a memory block is found in that cache level (i.e., a 'hit') or not found in that cache level (i.e., a 'miss'). After a miss in one level, the cache system attempts to retrieve the memory block from a higher level cache, or from the main memory (in the case of a miss in the LLC).

Prefetching can be used to reduce latencies for memory access requests that are part of a stream. As the higher level caches increase in size, the access latency generally also increases. Typical sizes for a two level hierarchical cache system may be, for example: a 32 KB L1 cache, a 1 MB L2 cache, and one or more 2 GB DRAM main memory modules. The latency of the L1 cache may be a few cycles, the latency of the L2 cache may be a few tens of cycles, and the latency of the main memory may be over a hundred cycles, where the 'cycles' are cycles of a clock signal generated by, or derived from, a clock circuit (not shown). The prefetcher can be configured to prefetch cache lines from any level of the memory hierarchy (or from the main memory) to a lower level, or in some embodiments, to prefetch all the way to the L1 cache level within the processor 102.

Typically, programs often exhibit strided behavior. Successive addresses of memory access requests associated with certain data used by the program could differ by a fixed difference, called the stride, where that difference is some integer multiple of a cache line (where the multiple is greater than 1). So, for example, starting with an address X, the addresses that are part of a strided stream with a stride S1 could be: X, X+S1, X+S1×2, . . . In some cases, such memory access requests are not necessarily consecutive, but are instead overlapped with other memory access requests, including requests for other strided streams. Thus, there could be two strided streams, starting at addresses X and Y, respectively, with strides S1 and S2, respectively, with the following pattern: X, X+S1, Y, Y+S2, Y+S2×2, X+S1× 2, . . . Such patterns may arise, for example, if the program is accessing a two dimensional array. These patterns can be detected by the prefetching techniques described herein, so that the data values in the strided streams are prefetched in advance of their use by the program.

There are certain conditions under which such a pattern of overlapped strided streams is detected by the prefetcher. One condition under which they can be detected, in some implementations, is when the initial addresses X and Y are on different virtual pages. Another condition under which they can be detected, in some implementations, is when the initial addresses X and Y are on the same virtual page, but the initial address for one strided stream is received after the other strided stream has already been established (or learned).

The prefetcher is also able to perform correlated prefetching, where the difference between successive addresses of memory access requests is a single cache line. Correlated prefetching can be useful, but because there may be a more significant chance for a false positive detection, potentially causing cache pollution, it is helpful to filter correlated prefetching detection using certain pre-conditions. One type of information that can be used to filter the detection of a correlated prefetching condition is a stored collection of previously accessed addresses that are associated with (e.g., by indexing into a table) predictions based on historical information, such as a next cache line prediction based on a saturating counter. For a counter that counts from 0 to N, the first N times a potential correlated prefetch condition is detected does not establish correlated prefetching of the next cache line, but after the counter saturates at N the correlated prefetching condition is established and a next cache line is prefetched. Optionally, if the correlated prefetching condition stops matching new memory access requests, the counter can be decremented. This filter will referred to as a 'next-line filter'.

The following pseudocode is an example of an algorithm for a prefetcher that prefetches for both strided streams and correlated prefetching, with a dependence between the strided stream and correlated prefetching prefetch requests that reduces false positive detection for correlated prefetching. In particular, a decision about whether or not to prefetch the next cache line for a received memory access request depends at least in part on whether or not that received memory access request matches a strided stream (e.g., matches a strided prefetch result stored in a table, even if there is no actual cache hit, as described in more detail below). A next-line filter for the correlated prefetching can also optionally be used to further reduce false positive detection, as described in more detail below. For each memory access request for a virtual address (VA), the logic in the following pseudocode used, including determining whether there is a 'hit' or 'miss' in the cache level used for prefetching (e.g., L1 data cache), and determining whether or not there is a 'match' in a 'stream table' storing both potential streams (in the process of being learned) and established streams (already learned). Note that it is possible to match an established stream without a hit in the cache, since a prefetch is sometimes performed under certain conditions, or a prefetch may include a 'lookahead' that prefetches a fixed amount ahead within a stream by multiplying the STRIDE by an integer LOOKAHEAD (which is 1 if there is no lookahead), causing a temporary transient over which there will be no cache hits. The granularity for the hits and matches to any VA may be a single data word, in which case all bits of the virtual address are sued. Alternatively, the granularity may be a single cache line, such that a memory access request for a data word value anywhere within a cache line is a hit/match to that cache line. This can be accomplished, for example, by ignoring the lowest order bits that represent the cache line offset. In the following examples, a data word granularity is used. An advantage of the granularity of data words for learning streams is that stride values that are not multiples of a cache line can be learned.

For each memory access request for a VA, the prefetcher determines a cache 'hit' or 'miss', and compares VA to the virtual address of each ENTRY in the stream table either for an exact match (to ENTRY.VA) or having the same virtual page number (VPN) as an entry, and performs the following, where W is the width of a single cache line (e.g., W=128 bits) and prefetch(T+S) is the command that, when called (or when "triggered"), performs a prefetch of the address T+S, where T is the "trigger address" and S is the "step size":

```
If (VA matches ENTRY.VA):
    IF ENTRY.STRIDE==0:
        ENTRY.VA = VA+W
        prefetch(VA+W*LOOKAHEAD)
    ELSE
        ENTRY.VA = VA+ENTRY.STRIDE
        prefetch(VA+ENTRY.STRIDE*LOOKAHEAD)
ELSE IF (VA misses in cache AND is has the same VPN as ENTRY
AND ENTRY.STRIDE==0):
    STRIDE = VA - (ENTRY.VA - W)
    If (-W < STRIDE < W): STRIDE = W
    ENTRY.STRIDE = STRIDE
ELSE IF (VA misses in cache):
    add new ENTRY
    ENTRY.VA = VA+W
    ENTRY.STRIDE = 0
    prefetch(VA+W)
```

Using this algorithm, the first address that misses in the cache and is not on the same page as an existing entry in the stream table is added to the stream table, with a prefetch performed for the next cache line. Another address that misses in the cache but is on the same page as an existing entry is used to compute a stride that will be used on any subsequent matches to a newly learned stream.

The stream table can use a least-recently-used (LRU) replacement policy for learning up to a maximum number of streams, or any other suitable replacement policy.

Any suitable circuitry, such as a content addressable memory (CAM) structure can be used to compare an incoming virtual address against addresses of all table entries, possibly multiple addresses at once (i.e., in the same cycle), if the pipeline allows it.

Figure 3:
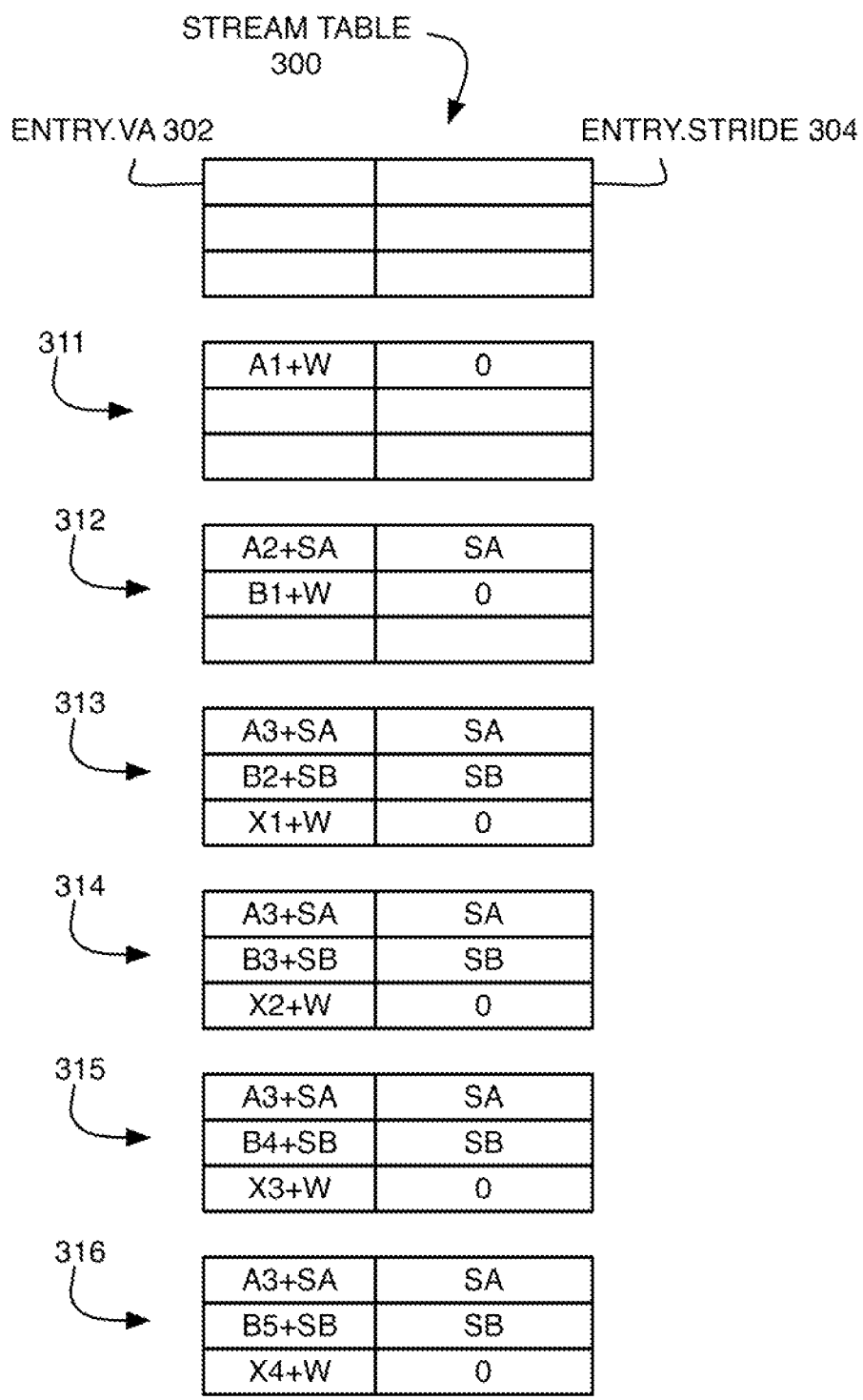
FIG. 3 is a schematic diagram illustrating different states of a stream table.

FIG. 2 illustrates memory access patterns for some example streams on three different virtual pages (PAGE 1, PAGE 2, PAGE 3). FIG. 3 shows the corresponding changing state of a stream table 300 at various stages as the streams are learned, which stores, for each entry, a virtual address for matching ENTRY.VA 302, and a stride ENTRY.STRIDE 304. Table state 311 shows the state after a request for virtual address A1 on PAGE 1 arrives, and because it doesn't match any entry and misses in the cache, A1+W is stored in a new entry corresponding to the next cache line that is prefetched. Table state 312 shows the state after: (1) the address A2 arrives, without matching or hitting, so that a new stride SA is learned (SA=2 W) and A2+SA is stored in the existing entry and is prefetched (assuming no lookahead, i.e., LOOKAHEAD=1), and (2) the address B1 on PAGE 2 arrives, without matching or hitting, so that B1+W is stored and prefetched. Table state 313 shows the state after: (1) the address A3 arrives, hitting and matching, so that A3+SA is stored and prefetched, (2) the address B2 arrives, without matching or hitting, so that a new stride SB is learned (SB=−4 W) and B2+SB is stored and prefetched, and (3) the address X1 on PAGE 3 arrives, without matching or hitting, so that X1+W is stored and prefetched. Table state 314 shows the state after: (1) the address B3 arrives, hitting and matching, so that B3+SB is stored and prefetched, and (2) the address X2 arrives, hitting and matching (as correlated prefetching), so that X2+W is stored and prefetched. Table state 315 shows the state after: (1) the address B4 arrives, hitting and matching, so that B4+SB is stored and prefetched, and (2) the address X3 arrives, hitting and matching (as correlated prefetching), so that X3+W is stored and prefetched. Table state 316 shows the state after: (1) the address B5 arrives, hitting and matching, so that B5+SB is stored and prefetched, and (2) the address X4 arrives, hitting and matching (as correlated prefetching), so that X4+W is stored and prefetched.

In some implementations of the algorithm, instead of prefetching the next cache line for every new entry or every established correlated prefetching condition, a next-line filter that uses a stored history of past next cache line prefetch requests can be used, as described above. For example, the prefetch(T+S) command can be replaced with a filtered prefetch command called filtered-prefetch(T+S, IND), where the algorithm would trigger the filtered prefetch command for every condition that would have triggered a prefetch command.

The filtered prefetch command can be configured to access stored history information by using the argument IND as an index into a 'correlation table' that stores information characterizing prior calls of the filtered prefetch command. That information will determine whether or not the next cache line at address T+S is actually prefetched. For example, the algorithm may be configured to use a history length of 2, indicating that when a filtered prefetch is triggered, the two most recent addresses for memory access requests (A followed by B) are used to determine whether are not the next cache line (B+W) should be prefetched. Then, the correlation table is updated based on repeated patterns of next cache line prediction results, as described in more detail below.

In some implementations, the correlation table stores a predetermined number of entries that are indexed by an index IND determined by a function of the address bits of cache lines of the most recent memory access requests. For example 1024 entries can be accessed using a 10-bit index value. So, after the sequence of memory access requests A, B, a 10-bit index value can be computed from any logical function (e.g., XOR) or chain of logical functions that combine bits of A and bits of B, excluding the lowest order bits that are part of a cache line offset (i.e., using addresses at the granularity of cache lines). In some implementations, the function that determines IND can also receive other arguments in addition to bits of A and bits of B. For example, bits of a program counter of the memory instruction that makes the memory access request can be used.

An entry in the correlation table (CT) at index IND may be assigned an initial value CT[IND]=0 (indicating no prefetch). If the pattern of memory requests A, B triggers a call of filtered-prefetch(B+W, IND), where IND is a function of A and B, then the correlation table entry would indicate no prefetch after that first occurrence. Then, if the next memory request is B+W, the same entry at index IND may be updated to the value CT[IND]=1 (indicating prefetch). Then, any subsequent occurrence of the pattern of memory requests A, B would trigger a call of filtered-prefetch(B+W, IND), which would prefetch B+W in response to the updated correlation table entry. An occurrence of A, B without being followed by B+W may then cause the correlation table entry to be updated again to CT[IND]=0, where IND is the same function of A and B.

Alternatively, instead of toggling a binary value stored in an entry in the correlation table, a saturating counter can be stored in the entry, which can be incremented or decremented instead of being set to 1 or 0, respectively, in response to a next cache line hit or miss after a given two-request pattern. That would cause the next cache line B+W to be prefetched after a particular number of instances of the pattern A, B, B+W instead of after only a single occurrence of that pattern. Every time the pattern A, B, B+W occurs, the prefetcher would increment the saturating counter until it saturates at a maximum value. Every time the pattern is broken (i.e., A, B, followed by C≠B+W), the prefetcher would decrement the saturating counter until it saturates at a minimum value. In some implementations, the prefetcher would prefetch only if the state of the saturating counter is at its maximum value.

Other implementations of correlated prefetching using the next-line filter are possible as well. For example, instead of a history length of 2, other history lengths could be used (e.g., 1, 3, 4, . . . ).

There may also be a variety of different implementations of the process of learning streams using the stream table. In the above examples, the stream table is accessed using virtual addresses. But, the choice can be made whether the prefetcher will learn streams based on virtual addresses or physical addresses. An advantage of using physical addresses is that the prefetcher does not need to be configured to manage translation issues or context information. If physical addresses are used, the L1 data cache within the processor memory system 108 would also be configured to be accessed using physical addresses, to ensure that the data being prefetched is not already in the L1 data cache. An advantage of using virtual addresses is that the prefetcher can be configured to operate by being coupled to the front-end of the pipeline 104 as soon as a virtual address is available. The pipeline 104 can be configured to follow the normal load hit/miss path.

An additional issue that can be managed by appropriate configuration of the prefetcher is proper handling of multiple prefetches of the same cache line when the granularity of data words is used for learning streams.

In the following example, there is a sequence of memory operations where the trigger of certain prefetch operations is associated with attempted load activity. 'Load to ADDR' indicates a load instruction that loads from an address ADDR, and 'Miss to ADDR' indicates handling a cache miss after a load instruction attempted loading address ADDR. ST[IND] indicates the stream table is accessed using IND as an index. The values T,S being stored in the accessed entry of the stream table represent the trigger address T and the stride S. 'Prefetch to ADDR' is the actual prefetch operation triggered by the load activity, which prefetches the address ADDR=T+S. In this example, cache lines are 128 bits wide. The sequence of operations is as follows:

Miss to 0. ST[0]=128,0. Prefetch to 256. (next cache line prefetched)

Miss to 256. ST[1]=384,0. Prefetch to 512. (next cache line prefetched)

Load to 128. ST[0]=256,128. Prefetch to 384. (stride of 128 determined)

Load to 256. ST[0]=384,128. Prefetch to 512. (redundant prefetch)

Load to 384. Hit in ST[0]. ST[0]=512,128. Prefetch to 640.

Load to 384. Hit in ST[1]. ST[1]=512,128. Prefetch to 640. (redundant prefetch)

The two prefetches of next cache lines indicated above as 'redundant prefetch' are redundant because the cache line being prefetched has already been prefetched earlier in the sequence. There are a variety of ways to manage such redundant prefetches of the next cache line. The following are examples of three different ways that the prefetcher can be configured to manage redundant prefetches.

1. Clean up the stream table after the fact. If an address is prefetched multiple times (e.g., the last two operations prefetching 640 in the sequence above), then remove all but one.

2. Don't perform the prefetch if merged in a 'miss address file' (MAF), and update the stream table based on that information. Any load or prefetch operations propagating through the pipeline 104 with a given virtual address will enter the MAF. If the MAF already has an outstanding operation with the same virtual address, then the incoming operation will be merged within the MAF. Information about the merged operations can be used to update the stream table.

3. Store a bit per cache line to allow a prefetch operation only on the first load hit to a prefetched cache line. This bit is reset to when a load hits on the prefetched cache line. Then, the trigger is changed to only data cache misses and load hits to a prefetched cache line. This would prevent a redundant prefetch operation on subsequent accesses to the prefetched cache line.

Other embodiments may fall within the scope of the following claims, which do not necessarily include all of the features or advantages of the embodiments described above.

What is claimed is:

1. A method for managing memory access requests to a cache system including one or more cache levels that are configured to store cache lines that correspond to memory blocks in a main memory, the method comprising:

storing stream information identifying recognized streams that were recognized based on previously received memory access requests, where one or more of the recognized streams comprise strided streams that each have an associated strided prefetch result corresponding to a stride that is larger than or equal to a size of a single cache line; and determining whether or not a next cache line prefetch request corresponding to a particular memory access request will be made based at least in part on whether or not the particular memory access request matches a strided prefetch result for at least one strided stream, and a history of past next cache line prefetch requests;

wherein a difference between an address of one of the previously received memory access requests and an address of the next cache line prefetch request corresponding to the particular memory access request is a single cache line, and one or more of the strided streams each has an associated strided prefetch result corresponding to a stride that is larger than a size of a single cache line.

2. The method of claim 1, wherein the strided streams comprise a plurality of strided streams, where a first strided stream has an associated first strided prefetch result corresponding to a first stride, and a second strided stream has an associated second strided prefetch result corresponding to a second stride that is larger than the first stride.

3. The method of claim 2, wherein the first strided prefetch result and the second strided prefetch result have a plurality of highest order address bits that are identical to each other.

4. The method of claim 1, wherein, for each of one or more strided streams included in the recognized streams, at least one next cache line prefetch request was made corresponding to at least one memory access request of a set of multiple memory access requests based on which that strided stream was recognized.

5. The method of claim 4, wherein each of the memory access requests of the set of multiple memory access requests has a plurality of highest order address bits that are identical to each other.

6. The method of claim 1, wherein the history of past next cache line prefetch requests comprises stored history information that depends on results of past next cache line prefetch requests corresponding to memory access requests made before the particular memory access request, and the stored history information is accessed based on a combination that includes: (1) bits from an address of the particular memory access request, and (2) bits from an address of at least one of the memory access requests made before the particular memory access request.

7. The method of claim 1, wherein each stride is computed based on a difference between a first address of a first memory access request and a second address of a second memory access request, where the first and second addresses have a plurality of highest order bits that are identical to each other.

8. A memory system comprising:

at least one memory controller for accessing a main memory;

a cache system including one or more cache levels that are configured to store cache lines that correspond to memory blocks in the main memory; and a memory access request manager configured to manage memory access requests, the managing including:

storing stream information identifying recognized streams that were recognized based on previously received memory access requests, where one or more of the recognized streams comprise strided streams that each have an associated strided prefetch result corresponding to a stride that is larger than or equal to a size of a single cache line; and determining whether or not a next cache line prefetch request corresponding to a particular memory access request will be made based at least in part on whether or not the particular memory access request matches a strided prefetch result for at least one strided stream, and a history of past next cache line prefetch requests;

wherein a difference between an address of one of the previously received memory access requests and an address of the next cache line prefetch request corresponding to the particular memory access request is a single cache line, and one or more of the strided streams each has an associated strided prefetch result corresponding to a stride that is larger than a size of a single cache line.

9. The memory system of claim 8, wherein the strided streams comprise a plurality of strided streams, where a first strided stream has an associated first strided prefetch result corresponding to a first stride, and a second strided stream has an associated second strided prefetch result corresponding to a second stride that is larger than the first stride.

10. The memory system of claim 9, wherein the first strided prefetch result and the second strided prefetch result have a plurality of highest order address bits that are identical to each other.

11. The memory system of claim 8, wherein, for each of one or more strided streams included in the recognized streams, at least one next cache line prefetch request was made corresponding to at least one memory access request of a set of multiple memory access requests based on which that strided stream was recognized.

12. The memory system of claim 11, wherein each of the memory access requests of the set of multiple memory access requests has a plurality of highest order address bits that are identical to each other.

13. The memory system of claim 8, wherein the history of past next cache line prefetch requests comprises stored history information that depends on results of past next cache line prefetch requests corresponding to memory access requests made before the particular memory access request, and the stored history information is accessed based on a combination that includes: (1) bits from an address of the particular memory access request, and (2) bits from an address of at least one of the memory access requests made before the particular memory access request.

14. The memory system of claim 8, wherein each stride is computed based on a difference between a first address of a first memory access request and a second address of a second memory access request, where the first and second addresses have a plurality of highest order bits that are identical to each other.

* * * * *